US009008822B2

(12) United States Patent
Wang et al.

(10) Patent No.: US 9,008,822 B2
(45) Date of Patent: Apr. 14, 2015

(54) ONLINE REAL-TIME CUTTER BREAKAGE MONITORING METHOD

(75) Inventors: Shih-Ming Wang, Taoyuan County (TW); Chien-Da Ho, Taoyuan County (TW)

(73) Assignee: Chung Yuan Christian University, Taoyuan County (TW)

( * ) Notice: Subject to any disclaimer, the term of this patent is extended or adjusted under 35 U.S.C. 154(b) by 426 days.

(21) Appl. No.: 13/455,405

(22) Filed: Apr. 25, 2012

(65) Prior Publication Data

US 2013/0211573 A1 Aug. 15, 2013

(30) Foreign Application Priority Data

Feb. 10, 2012 (TW) .............................. 101104340 A

(51) Int. Cl.
G06F 19/00 (2011.01)
B23Q 17/09 (2006.01)
G05B 19/4065 (2006.01)

(52) U.S. Cl.
CPC ........ G05B 19/4065 (2013.01); B23Q 17/0971 (2013.01); G05B 2219/37233 (2013.01); G05B 2219/37435 (2013.01); G05B 2219/50205 (2013.01)

(58) Field of Classification Search
USPC ...................................... 700/175, 213; 29/36
See application file for complete search history.

(56) References Cited

U.S. PATENT DOCUMENTS

| 6,004,017 | A  | * | 12/1999 | Madhavan ...................... 700/71 |
| 2002/0091460 | A1 | * | 7/2002 | Allen ............................. 700/173 |
| 2002/0129485 | A1 | * | 9/2002 | Mok et al. ..................... 29/527.2 |
| 2005/0119781 | A1 | * | 6/2005 | Collins .......................... 700/175 |
| 2011/0137452 | A1 | * | 6/2011 | Boyes et al. .................. 700/213 |

* cited by examiner

Primary Examiner — Michael D Masinick
Assistant Examiner — Anthony Whittington
(74) Attorney, Agent, or Firm — Rosenberg, Klein & Lee

(57) ABSTRACT

An online real-time cutter breakage monitoring method uses a plurality of signals generated in three consecutive time periods by a vibration acceleration during a cutting process conducted by a CNC machine tool, and compares a difference between a maximum value of signals in each time period and an average value of the signals and a difference between the average value of signals thereafter and an idling critical value to output a first cutter breakage signal and a second cutter breakage signal simultaneously and determine the occurrence of a cutter breakage and shut down the CNC machine tool immediately to improve the determination speed and accuracy, so as to avoid unnecessary shutdowns or hindering the manufacturing flow.

8 Claims, 4 Drawing Sheets

ONLINE REAL-TIME CUTTER BREAKAGE MONITORING METHOD

CROSS-REFERENCE TO RELATED APPLICATIONS

This non-provisional application claims priority under 35 U.S.C. §119(a) on Patent Application No(s). 101104340 filed in Taiwan, R.O.C. on Feb. 10, 2012, the entire contents of which are hereby incorporated by reference.

BACKGROUND OF THE INVENTION

1. Field of the Invention

The present invention relates to a cutting machine tool monitoring method, in particular to an online real-time cutter breakage monitoring method that uses a vibration acceleration signal to monitor a cutter breakage quickly during a cutting process.

2. Description of the Related Art

Cutting is a common manufacturing procedure applied in product manufacturing for removing extra materials on a workpiece to achieve a specific geometric shape and an appropriate surface precision, so that the cutting process must be stable. High speed machining (HSM) technology with the advantages of a high production efficiency, high manufacturing precision, and high surface quality is widely used in the area of manufacturing aerospace, molding, biomedical, automobile and 3C products. However, the manufacturing process of products of these sorts must avoid unexpected abnormal cutting situations such as chatter, build-up edge (BUE) and cutter breakage which may damage the products or cause a poor surface roughness, or even affect the life of machine tools and jeopardize the safety of the operators. Therefore, shutdowns are necessary to make necessary adjustments and thus resulting in low production efficiency.

Since most key components of machine tools such as motors or controllers made in Taiwan are exported and sold to foreign countries, therefore the abnormal online diagnostic system cannot be installed into the controller directly like other foreign major manufacturers such as Okuma, and an external compatible diagnostic system is adopted instead. At present, the online diagnosis and control system generally use an external sensor as the source of measuring cutting vibrations. In addition to the problem of a low reliability of the abnormality diagnostic method, the external sensor cannot determine the source of the vibration signal. For example, a machine produces vibrations when using G00 to perform a high speed positioning, and the system may misjudge it as an abnormal cutting vibration. Therefore, systems of this sort are applicable for simple experimental cutting such as a linear cutting only, but they cannot be applied in complicated cutting process.

The causes of the cutter breakage are nothing more than a too-fast feeding, a collision, or a life exhaustion of a cutter. If a cutter breakage occurs and the machine cannot be shut down immediately to exchange the cutter, time is wasted, and manufacturing cost is increased. In an abnormal cutting analysis of a cutter breakage, a very large vibration will be produced at the moment when the cutter is broken, and this vibration will be reflected by the acceleration signal, and vibrations that follow will be close to the vibration value of an idling main shaft since the cutter is no longer in contact with the workpiece.

In view of the problems above, the inventor of the present invention provides an online real-time cutter breakage monitoring method, and uses an online cutting abnormality intellectual monitoring system of a CNC machine tool to enhance the determination speed and accuracy of the real-time cutting manufacture monitoring by using the characteristics of the abnormal cutting vibrations occurred during a cutter breakage together with the analysis of the vibration acceleration signals, so as to avoid an unnecessary shutdown or hindering the manufacturing flow.

SUMMARY OF THE INVENTION

Therefore, it is a primary objective of the present invention to provide an online real-time cutter breakage monitoring method that uses a vibration signal capturing module and a monitoring subsystem to capture the cutting vibration acceleration signals in three consecutive time periods for an analysis, and compare the maximum values and the average values of the cutting vibration acceleration signals in the three consecutive time periods with one another, and the average value of the last time period is compared with an idling critical value, and the two-stage synchronous determination method can quickly and accurately determine the occurrence of a cutter breakage and enhance the speed and accuracy of the determinations significantly.

Another objective of the present invention is to provide an online real-time cutter breakage monitoring method, such that the system can be shut down immediately when a cutter breakage occurs, and a warning unit is installed and provided for alerting operators at site to take immediate actions to enhance the manufacturing efficiency effectively.

To achieve the foregoing objectives, the present invention provides an online real-time cutter breakage monitoring method using a vibration signal capturing module and a monitoring subsystem, and the monitoring subsystem is electrically coupled to the vibration signal capturing module, and the method comprises the steps of: capturing a plurality of cutting vibration acceleration signals when a CNC machine tool performs a cutting; comparing the cutting vibration acceleration signals in three consecutive time periods, and retrieving a maximum value and an average value of the cutting vibration acceleration signal in each time period; comparing the maximum value of the cutting vibration acceleration signals in the second time period with the average value of the cutting vibration acceleration signals in the first time period to obtain a difference value; observing the difference value, and determining whether the difference value matches a cutter breakage characteristic to output a first cutter breakage signal; defining an idling critical value, and calculating the average value of the cutting vibration acceleration signals in the third time period; determining whether average value of the cutting vibration acceleration signals of the third time period and thereafter is smaller than the idling critical value to output a second cutter breakage signal; using the monitoring subsystem to receive the first cutter breakage signal and the second cutter breakage signal simultaneously to determine an occurrence of a cutter breakage of the CNC machine tool; and outputting a shutdown signal to the CNC machine tool to shut down an operation. Wherein, the time period T is 1 second. Wherein, the vibration signal capturing module comprises a vibration accelerometer, a signal amplifier, a signal capturing box and a data retrieval card, and the vibration accelerometer is installed onto a fixture of the CNC machine tool and electrically coupled to the signal amplifier, and the signal amplifier is electrically coupled to the signal capturing box, and the signal capturing box is electrically coupled to the monitoring subsystem through the data retrieval card and provided for capturing and processing the cutting vibration acceleration signals when a cutter of the CNC machine tool is in contact with a workpiece on the fixture, so as to capture the cutting vibration acceleration signals when the workpiece is in contact with the cutter during the cutting process and enhance the reliability significantly. The present invention can determine the occurrence of a cutter breakage within three seconds. As the sampling number is increased, a higher real-time monitoring effect can be achieved.

In a preferred embodiment, the idling critical value used in the online real-time cutter breakage monitoring method of the present invention is calculated by multiplying 1·2 with an arithmetic average value which is the maximum value of an idling vibration acceleration signal in each time period, and the idling vibration acceleration signals in ten consecutive time periods are captured when a main shaft of the CNC machine tool is idled.

In a preferred embodiment, the online real-time cutter breakage monitoring method of the present invention further comprises a warning unit electrically coupled to the monitoring subsystem, and when the monitoring subsystem outputs the shutdown signal, a driving signal is outputted synchronously to the warning unit to alert an operator to handle a cutter breakage condition, wherein the warning unit is a buzzer, a warning lamp or their combination, so that sound, light or their combination can be provided for alerting operators at site quickly.

In a preferred embodiment, the online real-time cutter breakage monitoring method of the present invention further comprises a wireless signal transmitter and a wireless signal receiver, and the wireless signal transmitter is electrically coupled to the warning unit and driven by the driving signal to issue a warning signal to the wireless signal receiver for alerting an operator to handle a cutter breakage condition.

DETAILED DESCRIPTION OF THE PREFERRED EMBODIMENTS

The technical contents of the present invention will become apparent with the detailed description of preferred embodiments and the illustration of related drawings as follows.

Figure 1:
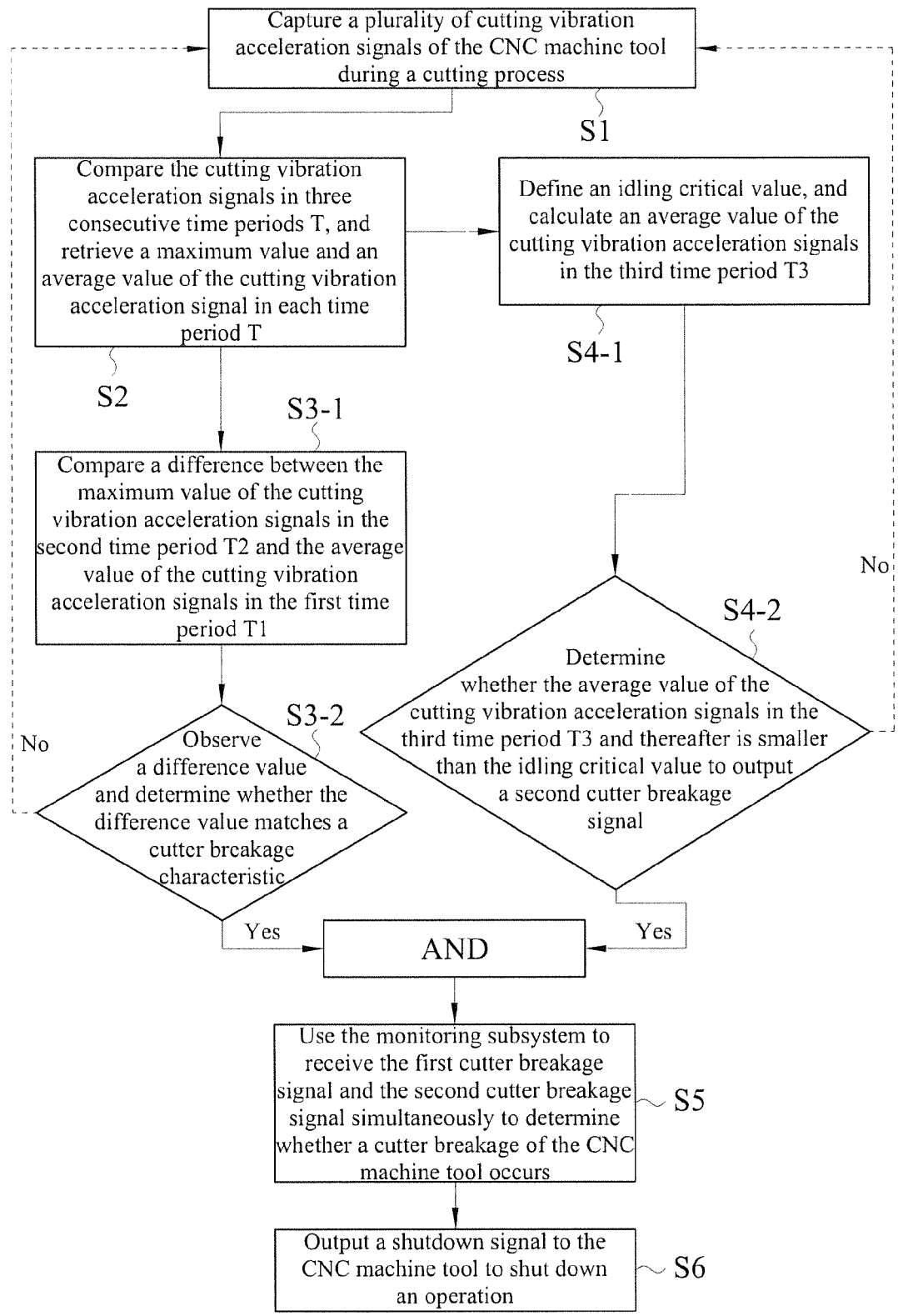
FIG. 1 a flow chart of a cutter breakage monitoring method in accordance a preferred embodiment of the present invention.
Figure 2:
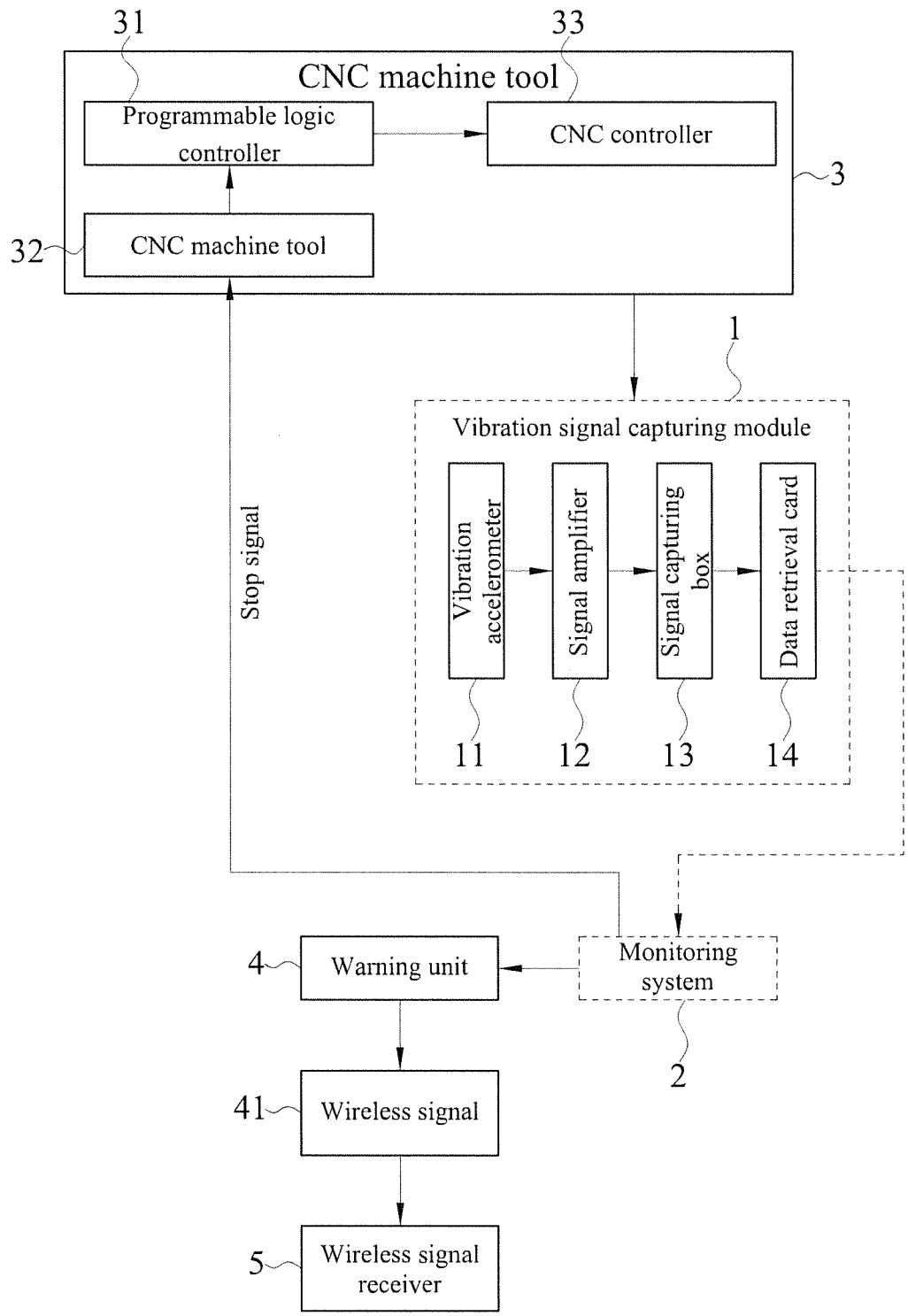
FIG. 2 a hardware block diagram of a preferred embodiment of the present invention.

With reference to FIGS. 1 and 2 or a flow chart and a hardware block diagram of a cutter breakage monitoring method in accordance with a preferred embodiment of the present invention respectively, the online real-time cutter breakage monitoring method uses a vibration signal capturing module 1 and a monitoring subsystem 2 to monitor the cutting condition of a CNC machine tool 3, wherein the vibration signal capturing module 1 comprises a vibration accelerometer 11, a signal amplifier 12, a signal capturing box 13 and a data retrieval card (DAQ) 14, and the vibration accelerometer 11 is installed to a fixture (not shown in the figure) of the CNC machine tool 3 and electrically coupled to the signal amplifier 12, and the signal amplifier 12 is electrically coupled to the signal capturing box 13, and the signal capturing box 13 is electrically coupled to the monitoring subsystem 2 through the data retrieval card 14 for sensing the cutting vibration acceleration signals during a cutting process, and the sensed cutting vibration acceleration signal is amplified to facilitate observations and analyses, and the signal capturing box 13 is provided for capturing the amplified cutting vibration acceleration signals, and the data retrieval card 14 is provided for an analog/digital conversion, and the converted digital signals are transmitted to the monitoring subsystem 2. In addition, the CNC machine tool 3 comprises a programmable logic controller (PLC) 31, a computer numerical control (CNC) controller 32 and a CNC manufacturing tool 33. The operating procedure comprises the following steps:

S1: Capture a plurality of cutting vibration acceleration signals of the CNC machine tool 3 during a cutting process.

Figure 3:
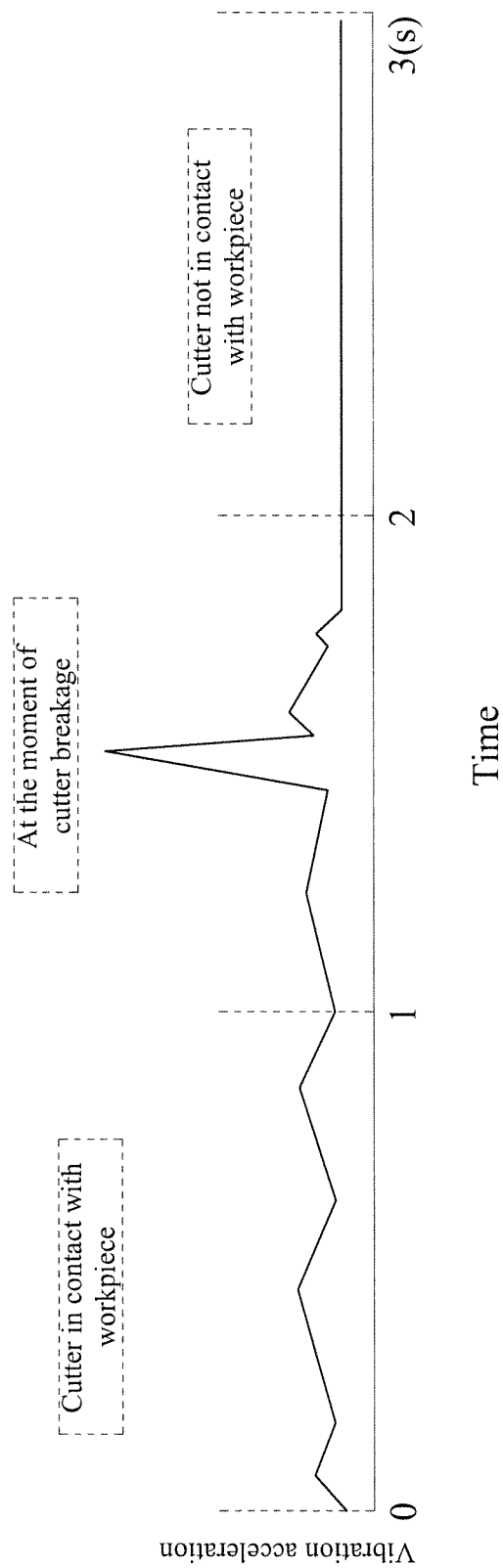
FIG. 3 a graph analyzing the characteristics of a cutter breakage signal of a preferred embodiment of the present invention.
Figure 4:
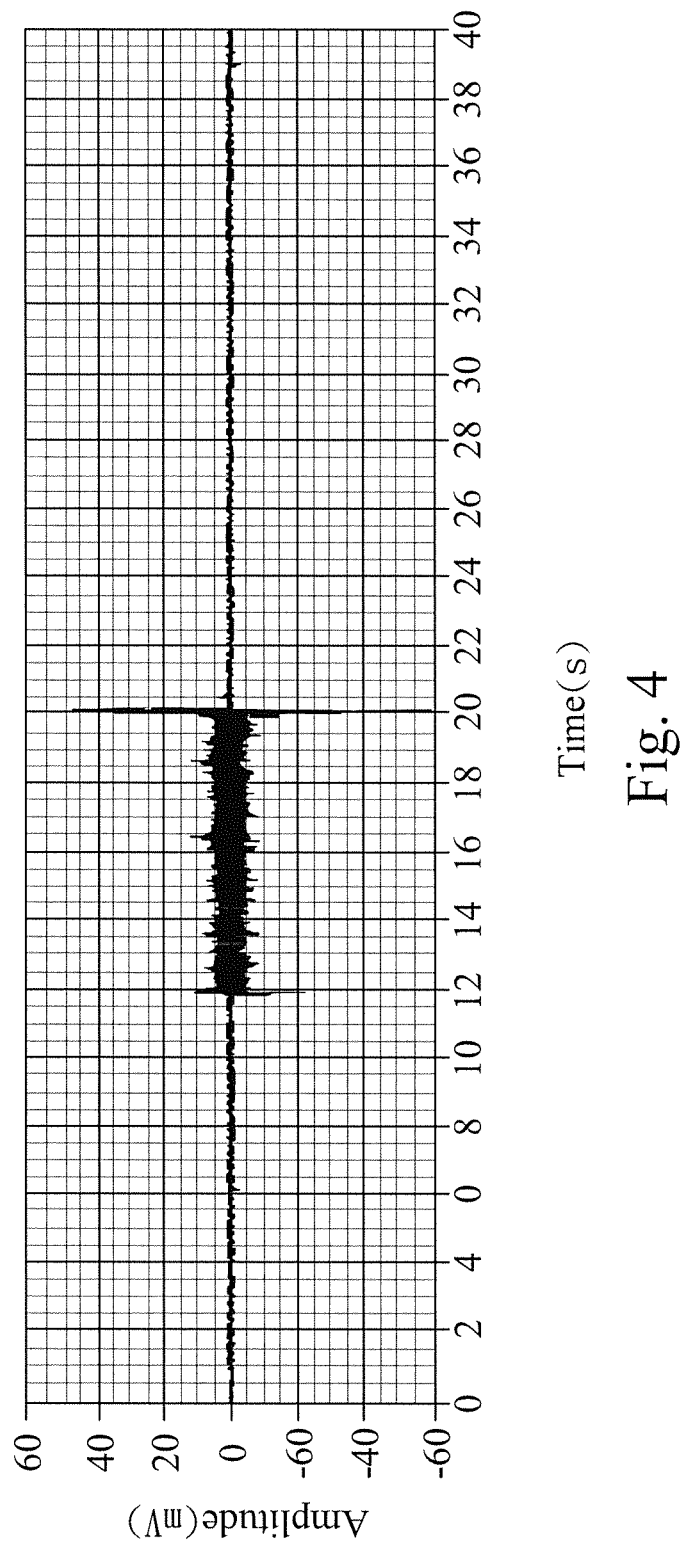
FIG. 4 is a graph of a vibration acceleration signal of a cutter breakage in accordance with a preferred embodiment of the present invention.

S2: Compare the cutting vibration acceleration signals in three consecutive time periods T, and retrieve a maximum value and an average value of the cutting vibration acceleration signal in each time period T. Wherein, the time period T of the present invention is equal to 1 second. Since the period of the spontaneous abnormality of a cutter breakage is approximately equal to 3 seconds, and the capturing method set by the system is taken into consideration, the cutter diagnosis also adopts the capturing unit of 1 second and compares and determines the signals of three consecutive seconds match the characteristic of a cutter breakage, so that the condition of a cutter breakage can be determined within 3 seconds, but the invention is not limited to such arrangement only. The time period for the sampling can be increased or decreased according to the actual implementation requirements. With reference to FIGS. 3 and 4 for the graphs analyzing the characteristics of a cutter breakage signal and its corresponding vibration acceleration signal of a preferred embodiment of the present invention respectively, the inventor of the present invention discovers from the actual observations and experiments that the causes of the occurrence of a cutter breakage are nothing more than a too-fast feeding, a collision, or a life exhaustion of a cutter.

Therefore, the vibration acceleration may have the following two characteristics when a cutter breakage occurs. (1) Very large vibration acceleration is produced at the moment when the cutter breakage occurs, since the breakage of the cutter will suddenly release energy (occurred at approximately the $20^{th}$ second as shown in the figure) during the cutting process. The very large vibration produced spontaneously is reflected on the vibration acceleration signal. (2) The vibration acceleration after the cutter breakage takes place tends to be equal to that of an idling main shaft, since the cutter is no longer in contact with the workpiece after the cutter is broken. Therefore, a signal captured by the vibration accelerometer 11 tends to become a signal of an idling main shaft (occurred at approximately the $20^{th}$ second as shown in the figure). Any cutter breakage must satisfy the conditions of the aforementioned two characteristics, and the present invention establishes a cutter breakage diagnostic algorithm and a determination procedure thereof based on the aforementioned two characteristics.

S3-1: Compare a difference between the maximum value of the cutting vibration acceleration signals in the second time period $T_2$ and the average value of the cutting vibration acceleration signals in the first time period $T_1$. In the previous time period, the cutter and the workpiece are contacted and maintained at a stable cutting status, so that the average value of the cutting vibration acceleration signals is used, and if the signal is increased suddenly during the occurrence of a cutter breakage, the maximum value of the cutting vibration acceleration signals in the next time period is compared with the average value of the cutting vibration acceleration signals.

S3-2: Observe a difference value and determine whether the difference value matches a cutter breakage characteristic to output a first cutter breakage signal. Since very large vibration acceleration is produced at the moment when a cutter breakage occurs, and this characteristic is used for the analysis. In addition, the cutting vibration acceleration signals are captured in three consecutive seconds as shown in FIG. 3, wherein a normal cutting vibration acceleration signal is captured from 0 to 1 second before the abnormality occurs, and an abnormal signal is captured from 1 to 2 seconds when the cutter breakage occurs, and experiments of this research show that the maximum amplitude of this acceleration signal is at least greater than three times of the average amplitude of the previous second (or the previous time period from 0 to 1 second), and a critical threshold value of the cutter breakage diagnostic algorithm is set. Therefore, when we observe and determine whether the difference value matches the cutter breakage characteristic, the maximum value of the current cutting vibration acceleration is determined whether it is greater than three times of the average value (which is the critical threshold value) of the cutting vibration acceleration signal captured at the previous second, so that we can know whether or not there is an abnormal vibration corresponding to the cutter breakage characteristic occurred in the first stage during the cutting process to output a first cutter breakage signal.

S4-1: Define an idling critical value, and calculate an average value of the cutting vibration acceleration signals in the third time period $T_3$. The vibration value at idling varies with time and environment, but its value will fall within a specific range. Since a certain resistance exists between the cutter and the workpiece during the cutting process, the vibration acceleration produced will be much greater than that of an idled machine, therefore the idling critical value is defined to distinguish the time when the cutter is not in contact with the workpiece, and the idling critical value is calculated by multiplying 1·2 with an arithmetic average value which is the maximum value of an idling vibration acceleration signal in each time period, and the idling vibration acceleration signals in any ten consecutive time periods are captured when a main shaft of the CNC machine tool is idled. The idling critical value can be used as a basis for determining whether the cutter is in contact with the workpiece. If the cutting vibration acceleration signal is smaller than the idling critical value, we can consider that the cutter is not in contact with the workpiece.

S4-2: Determine whether the average value of the cutting vibration acceleration signals in the third time period $T_3$ and thereafter is smaller than the idling critical value to output a second cutter breakage signal. In FIG. 3, the third time period $T_3$ which is the time period from the $2^{nd}$ second to the $3^{rd}$ second is observed, and the tendency of the average value of the cutting vibration acceleration signal in the third time period $T_3$ is analyzed. If the average value of the cutting vibration acceleration signal of a vibration captured by the vibration accelerometer 11 in the $2^{nd}$ to $3^{rd}$ second is smaller than the idling critical value, then it is considered that the cutter is not in contact with the workpiece, which is in an idle state. When a cutter breakage occurs, the acceleration measured within the $2^{nd}$ to $3^{rd}$ second and caused by the collision of the broken cutter onto the workpiece is still greater than the idling critical value, therefore another condition is determined to occur in the process. If the average value of the cutting vibration acceleration signal after the $3^{rd}$ second is smaller than the idling critical value, it is still considered as being in the idle state, and the aforementioned different idle states can be consider as a cutter breakage condition to output the second cutter breakage signal.

S5: Use the monitoring subsystem 2 to receive the first cutter breakage signal and the second cutter breakage signal simultaneously to determine whether a cutter breakage of the CNC machine tool 3 occurs.

S6: Output a shutdown signal to the CNC machine tool 3 to shut down an operation. In addition to the determination of the occurrence of a cutter breakage, the present invention further electrically coupling the monitoring subsystem 2 with a warning unit 4, such that while the monitoring subsystem 2 is outputting the shutdown signal, a driving signal is outputted to the warning unit 4 synchronously, wherein the warning unit 4 is a buzzer, a warning lamp and their combination, and sound, light or their combination can be used to inform operators at site. Alternatively, a wireless signal transmitter 41 and a wireless signal receiver 5 can be used, wherein wireless transmitter 41 is electrically coupled to the warning unit 4 and driven by the driving signal to issue a warning signal to the wireless signal receiver 5 to alert operators at site to handle the cutter breakage condition, and avoid a too-long shutdown that causes low production efficiency.

In summation, the online real-time cutter breakage monitoring method of the present invention analyzes the cutting vibration acceleration signals in three consecutive time periods during the cutting process conducted by the CNC machine tool 3 through the vibration signal capturing module 1 and the monitoring subsystem 2, and then the two-stage synchronous determination method is used to determine the occurrence of the cutter breakage quickly and accurately. The system is shut down immediately after the cutter breakage occurs. With the installation of the warning unit 4, a sound and light effect or a remote wireless connection is used to alert operators at site to handle the cutter breakage problem, so as to avoid a too-long shutdown that causes low production efficiency. Obviously, the present invention can enhance the manufacturing efficiency.

While the invention has been described by means of specific embodiments, numerous modifications and variations could be made thereto by those skilled in the art without departing from the scope and spirit of the invention set forth in the claims.

In summation of the description above, the present invention improves over the prior art and complies with patent application requirements, and thus is duly filed for patent application.

What is claimed is:

1. An online real-time cutter breakage monitoring method, using a vibration signal capturing module and a monitoring subsystem, and the monitoring subsystem being electrically coupled to the vibration signal capturing module, and the method comprising the steps of:
   capturing a plurality of cutting vibration acceleration signals when a CNC machine tool performs a cutting;
   comparing the cutting vibration acceleration signals in three consecutive time periods, and retrieving a maximum value and an average value of the cutting vibration acceleration signal in each time period;
   comparing the maximum value of the cutting vibration acceleration signals in a second time period with the average value of the cutting vibration acceleration signals in a first time period to obtain a difference value;

observing the difference value, and determining whether the difference value matches a cutter breakage characteristic to output a first cutter breakage signal;

defining an idling critical value, and calculating the average value of the cutting vibration acceleration signals in a third time period;

determining whether average value of the cutting vibration acceleration signals of the third time period and thereafter is smaller than the idling critical value to output a second cutter breakage signal;

using the monitoring subsystem to receive the first cutter breakage signal and the second cutter breakage signal simultaneously to determine an occurrence of a cutter breakage of the CNC machine tool; and outputting a shutdown signal to the CNC machine tool to shut down an operation if both the first cutter breakage signal and the second cutter breakage signal are received by the monitoring subsystem.

2. The online real-time cutter breakage monitoring method of claim 1, wherein the time period T is 1 second.

3. The online real-time cutter breakage monitoring method of claim 1, wherein the idling critical value is calculated by multiplying 1·2 with an arithmetic average value which is the maximum value of an idling vibration acceleration signal in each time period, and the idling vibration acceleration signals in ten consecutive time periods are captured when a main shaft of the CNC machine tool is idled.

4. The online real-time cutter breakage monitoring method of claim 1, further comprising a warning unit electrically coupled to the monitoring subsystem.

5. The online real-time cutter breakage monitoring method of claim 4, wherein when the monitoring subsystem outputs the shutdown signal, a driving signal is outputted synchronously to the warning unit to alert an operator to handle a cutter breakage condition.

6. The online real-time cutter breakage monitoring method of claim 5, wherein the warning unit is one selected from the collection of a buzzer, a warning lamp and a combination thereof.

7. The online real-time cutter breakage monitoring method of claim 5, further comprising a wireless signal transmitter and a wireless signal receiver, and the wireless signal transmitter being electrically coupled to the warning unit and driven by the driving signal to issue a warning signal to the wireless signal receiver for alerting an operator to handle a cutter breakage condition.

8. The online real-time cutter breakage monitoring method of claim 1, wherein the vibration signal capturing module comprises a vibration accelerometer, a signal amplifier, a signal capturing box and a data retrieval card, and the vibration accelerometer is installed onto a fixture of the CNC machine tool and electrically coupled to the signal amplifier, and the signal amplifier is electrically coupled to the signal capturing box, and the signal capturing box is electrically coupled to the monitoring subsystem through the data retrieval card and provided for capturing and processing the cutting vibration acceleration signals when a cutter of the CNC machine tool is in contact with a workpiece on the fixture.

* * * * *